United States Patent
Stervik et al.

(10) Patent No.: US 8,276,694 B2
(45) Date of Patent: Oct. 2, 2012

(54) ARRANGEMENT FOR A POWER ELECTRONICS UNIT IN A HYBRID VEHICLE

(75) Inventors: Hans Stervik, Kärna (SE); Ivar Alm, Öckerö (SE)

(73) Assignee: Volvo Lastvagnar AB, Göteborg (SE)

( * ) Notice: Subject to any disclaimer, the term of this patent is extended or adjusted under 35 U.S.C. 154(b) by 230 days.

(21) Appl. No.: 12/919,489

(22) PCT Filed: Feb. 26, 2008

(86) PCT No.: PCT/SE2008/000162
§ 371 (c)(1),
(2), (4) Date: Sep. 9, 2010

(87) PCT Pub. No.: WO2009/108086
PCT Pub. Date: Sep. 3, 2009

(65) Prior Publication Data
US 2011/0005849 A1    Jan. 13, 2011

(51) Int. Cl.
*B60K 6/48* (2007.10)
(52) U.S. Cl. .............. 180/65.22; 180/65.25; 310/52
(58) Field of Classification Search .............. 180/60, 180/65.31, 65.1, 65.22, 65.225, 65.25, 65.275, 180/65.285; 903/902; 310/51, 52, 54; 477/3, 477/5; 381/707
See application file for complete search history.

(56) References Cited

U.S. PATENT DOCUMENTS

| | | | | |
|---|---|---|---|---|
| 5,343,970 A * | 9/1994 | Severinsky | ............... | 180/65.25 |
| 6,571,895 B2 * | 6/2003 | Weimer | ............... | 180/65.1 |
| 6,943,293 B1 * | 9/2005 | Jeter et al. | ............... | 174/548 |
| 7,969,735 B2 * | 6/2011 | Nakatsu et al. | ............... | 361/699 |
| 2004/0134695 A1 * | 7/2004 | Blome et al. | ............... | 180/65.2 |
| 2007/0284157 A1 * | 12/2007 | Heller et al. | ............... | 180/54.1 |

FOREIGN PATENT DOCUMENTS

| DE | 1024592 A1 | 11/2002 |
|---|---|---|
| DE | 102006000732 A1 | 7/2007 |

OTHER PUBLICATIONS

International Search Report for corresponding International Application PCT/SE2008/000162.
International Preliminary Report on Patentability for corresponding International Application PCT/SE2008/000162.

* cited by examiner

*Primary Examiner* — John Walters
*Assistant Examiner* — James Triggs
(74) *Attorney, Agent, or Firm* — WRB-IP LLP

(57) ABSTRACT

Arrangement for a power electronics unit in a hybrid vehicle power train, where all attachment points have a total thermal conductivity corresponding to less than 10 degrees temperature difference on a Kelvin-scale between electronics of said power electronics unit and the outside of said first transmission side for 5 kW of heat originating from one side of said attachment point. Arrangements including sound damping capabilities are disclosed. The arrangement can provide fewer parts and increased functionality of the power electronics unit.

13 Claims, 4 Drawing Sheets

ARRANGEMENT FOR A POWER ELECTRONICS UNIT IN A HYBRID VEHICLE

BACKGROUND AND SUMMARY

The present invention relates to an arrangement in a hybrid electric vehicle (HEV) equipped with a combustion engine, a transmission and at least one electric motor/generator, and where a power electronics unit of the electric motor/generator is mounted on a gearbox of said transmission.

The need to reduce fossil fuel consumption and emissions in vehicles powered by an internal combustion engine (ICE) is well known. Vehicles powered by electric motors attempt to address these needs. However, electric vehicles have limited range and limited power capabilities and need substantial time to recharge their batteries. An alternative solution is to combine both an ICE and electric traction motor into one vehicle. Such vehicles are typically called Hybrid Electric Vehicles (HEVs). See for example, U.S. Pat. No. 5,343,970.

The HEV is described in a variety of configurations. Many HEV patents disclose systems in which an operator is required to select between electric and internal combustion operation. In other configurations, the electric motor drives one set of wheels and the ICE drives a different set.

Other, more useful, configurations have developed. For example, a Series Hybrid Electric Vehicle (SHEV) configuration is a vehicle with an engine (most typically an ICE) connected to an electric motor called a generator. The generator, in turn, provides electricity to a battery and another motor, called a traction motor. In the SHEV, the traction motor is the sole source of wheel torque. There is no mechanical connection between the engine and the drive wheels.

A Parallel Hybrid Electrical Vehicle (PHEV) configuration has an engine (most typically an ICE) and an electric motor that together provide the necessary wheel torque to drive the vehicle. Additionally, in the PHEV configuration, the motor can be used as a generator to charge the battery from the power produced by the ICE. The PHEV has usually a transmission between the ICE and drive wheels of the vehicle in order to be able to alter gear ratio between the ICE and the drive wheels and also in many cases between the electric motor and the drive wheels.

A Parallel/Series Hybrid Electric Vehicle (PSHEV) has characteristics of both PHEV and SHEV configurations and is typically known as a "powersplit" configuration. In the PSHEV, the ICE is mechanically coupled to two electric motors in a planetary gearset transaxle. A first electric motor, the generator, is connected to a sun gear. The ICE is connected to a carrier. A second electric motor, a traction motor, is connected to a ring gear (output) via additional gearing in a transaxle. Engine torque powers the generator to charge the battery. The generator can also contribute to the necessary wheel (output shaft) torque. The traction motor is used to contribute wheel torque and to recover braking energy to charge the battery if a regenerative braking system is used.

The desirability of combining an ICE with an electric motor is clear. The ICE's fuel consumption and emissions are reduced with no appreciable loss of vehicle performance or range. Nevertheless, there remains a substantial opportunity to develop ways to optimize HEV operation.

One area of development is maintaining the desired operating temperature of the HEV components. A cooling system maintains optimal component operation and performance. Overheated components adversely affect efficiency and may eventually cause component failure.

A typical prior art cooling arrangement for an ICE vehicle has a coolant fluid in an enclosed loop that passes through certain vehicle components and a heat exchanger (radiator). A heater core is also typically added to vent engine heat into the passenger compartment as desired. The engine and transmission components typically require cooling from a liquid cooling system. As the coolant circulates through these components in the closed loop, it absorbs heat that is released as the coolant passes through the radiator and heater core.

Coolant flow in the prior art cooling arrangement is typically controlled by a pump driven front-end accessory drive (FEAD). As engine speed increases, the speed of the pump also increases allowing more coolant flow through the system. Additionally, a thermostat within the loop only allows coolant flow through the radiator after the coolant temperature reaches a level at which the engine temperature has stabilized and is considered "warmed up."

Though simple and reliable, the prior art coolant control system comprising a pump and a thermostat is inadequate for HEVs. For example, the HEV has additional components that require cooling, such as a power electronics unit. Further, the prior art coolant pump does not function when the engine is off. Thus, the typical vehicle accessories driven by the FEAD (including the coolant pump, air conditioning, and power steering) in a conventional vehicle must be powered by an alternate source in the HEV to maintain their functionality when the engine is not running.

The cooling arrangement of a prior art transmission usually comprises a predetermined amount of cooling lubricant contained in the transmission housing. Some of the gear wheels of the transmission are arranged to be in contact with the cooling lubricant. When the gear wheels of the transmission rotate during operation, the cooling lubricant is splashed around in the transmission housing, making the lubricant coming into contact with basically all parts inside the transmission housing. The lubricant evens the heat build up in the transmission and contributes to heat being conducted to the transmission housing. The transmission housing can be cooled by ambient air. There are also transmission cooling arrangements where the lubricant is circulated by a pump through cooling channels inside the transmission housing and outside the transmission housing to a heat exchanger.

In a heavy HEV, such as a truck more than 5 tonnes it is common for an electric motor/generator to have a performance capacity of more than 100 kW. A power electronics unit for such a relatively powerful electric motor/generator produces a lot of heat during operation that has to be cooled in order to secure the endurance of the electronic components in the power electronics unit. Depending on the specification of the electronic components the maximum allowable temperature varies. Electronic components with less heat resistance are cheap and can have a maximum operative temperature of, for example, 60 degrees Celsius. If the electronic components are specified to withstand temperatures of several hundred degrees Celsius then usually less cooling of the power electronics unit is needed. On the other hand such electronic components are expensive. In the future the power electronics unit is expected to shrink in size due to technical development. The demand for cooling will probably increase since the electronic components will be more densely packed and the electric power handled by the power electronics unit will increase concurrently with the use of more powerful electric motor/generators used in future HEV.

US2004/0134695 discloses a vehicle power train with a combustion engine, a gearbox and an Integrated Starter/Generator (ISG) arranged between the combustion engine and the gearbox. Thus, this document does not disclose a HEV, still, in one embodiment disclosed the power electronics unit of the ISG is arranged on the gearbox. The power demand of an ISG is usually between 1 to 5 kW. The power electronics unit of the ISG is, thus, relatively small and handles a relatively low power. The need for cooling is relatively small. Further, this document discloses an embodiment where a cooling arrangement of the engine also is used for cooling the power electronics unit, when the power electronics unit is arranged on the engine. Only two standard mounting points for a conventional ring gear starter are used when the power electronics unit is mounted on the engine. There is also disclosed a plug in connection between the power electronics unit and the ISG.

Noise from a vehicle power train is always an issue. The transmission components of a vehicle transmission contributes to the increase of noise when in operation. A step geared transmission, especially when gear changing frequently, can cause slamming and rattling, which can be disturbing for the environment. A known noise damping solution is to arrange a relatively thin plate on the outside of the transmission housing. The fixing point of the plate extends around the whole periphery of one side of the plate. Said transmission outside, said plate side and said fixing point enclose a compartment comprising a medium, such as air, with high noise damping capabilities. The fixing point as such can be of a noise damping material such as rubber or the like.

It is desirable to make an arrangement for a power electronics unit in a HEV more space effective with a minimal amount of components. It is desirable to contribute to a simple and effective installation of a cooling arrangement of said power electronics unit and to contribute to noise reduction of said vehicle.

The arrangement according to an aspect of the invention is an arrangement for a power electronics unit in a hybrid vehicle power train, said hybrid vehicle power train comprising a combustion engine arranged for propulsion, and an electric motor/generator arranged for propulsion, a transmission with a transmission housing, said transmission is arranged to adapt gear ratio between at least one of said propulsion units and driven vehicle wheels. Said motor/generator is arranged to exchange electric power with a power electronics unit. A cooling arrangement is arrange for cooling at least said transmission with said transmission housing. Said power electronics unit is shaped substantially as a plate, where a first biggest cross-sectional area of said plate is extended substantially along and substantially within a first transmission side of said transmission housing and covering at least a part of said first transmission side, said power electronics unit is fixed to said hybrid vehicle power train with at least one first attachment point. The invention is characterized, according to an aspect thereof, in that all attachment points have a total thermal conductivity corresponding to less than 10 degrees temperature difference on a Kelvin-scale between electronics of said power electronics unit and the outside of said first transmission side for 5 kW of heat originating from one side of said attachment point.

The advantage is that in this way a cooling arrangement for said transmission (for example air cooling of transmission housing and transmission lubricant or cooling of transmission with cooling fluid flowing through cooling channels or cooling of transmission with channels leading transmission lubricant through a heat exchanger in a cooling system with cooling fluid) can be used for cooling said power electronics unit, especially during temporary peak loads. The opposite can also happen, that is, that a cooling arrangement for cooling said power electronics unit can be used to cool said transmission especially when the loads on the transmission are high. If there is no cooling arrangement with cooling channels the relatively big mass of the transmission will advantageously contribute to level out temporary heat peaks in the power electronics unit.

A further advantage with the arrangement according to an aspect of the invention is increased space efficiency of the power electronics unit installation at the same time as the thermal conductivity of the attachment point/-s has/have been increased, which increases the performance of the cooling arrangement of the power electronics unit.

According to one embodiment of the arrangement according to an aspect of the invention a first side of said power electronics unit, facing said transmission, and said first transmission side are in contact with each other, forming said first attachment point as a wall to wall attachment point.

According to one embodiment of the arrangement according to an aspect of the invention said first side of the power electronics unit and said first transmission side are integrated and form a common wall between said transmission and electronics of said power electronics unit. In this way less parts can be used and a better thermal conductivity is achieved.

According to one further embodiment of the arrangement according to an aspect of the invention said common wall comprises cooling channels connected to said cooling arrangement for cooling said power electronics unit and said transmission. Thus, the cooling channels are used for cooling both the transmission and the power electronics unit.

According to one further embodiment of the arrangement according to an aspect of the invention said electric motor/generator and said power electronics unit are connected and fixed to each other. Said connection is a second attachment point formed by a plug in connection. In a further developed embodiment said plug in connection is arranged to transmit at least one of or both of a cooling medium for said cooling arrangement and electric power between said motor/generator and said power electronics unit. The advantage is that the number of electric wires and/or cooling medium tubes can be decreased.

In a further embodiment of an aspect of the invention said power electronics unit plate is arranged to cover said first transmission side in such a way as to damp noise originating from said transmission. In a further developed embodiment this is achieved by said power electronics unit comprising a casing of noise damping material, and which casing covers said electronics when arranged on said first transmission side. The advantage is that the power electronics unit also can be used for damping noise. In a even further developed embodiment of the invention said power electronics unit plate comprises said noise damping design and in an extended part only of a noise damping material, and where said extended part is arranged in order to better cover said first transmission side.

According to one embodiment of the arrangement according to an aspect of the invention a second electric motor/generator with a second power electronics unit are arranged in connection to said transmission, and where said second power electronics unit is arranged along a second transmission side of said transmission housing. The advantage is that the number of components can be decreased further and the noise reduction capabilities can be kept on a high level without any additional noise reducing components.

BRIEF DESCRIPTION OF THE DRAWING

The present invention will be described in greater detail below with reference to the accompanying drawings which, for the purpose of exemplification, shows further preferred embodiments of the invention and also the technical background, and in which.

DETAILED DESCRIPTION

Figure 1A:
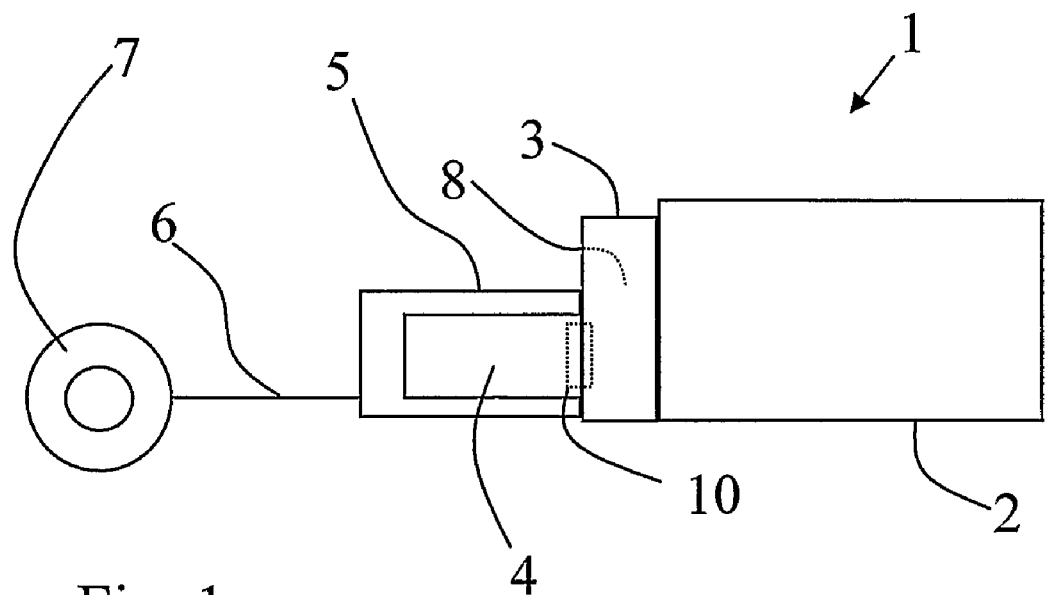
FIGS. 1a and 1b diagrammatically shows a PHEV power train in two different views of an embodiment of the invention.
Figure 1B:
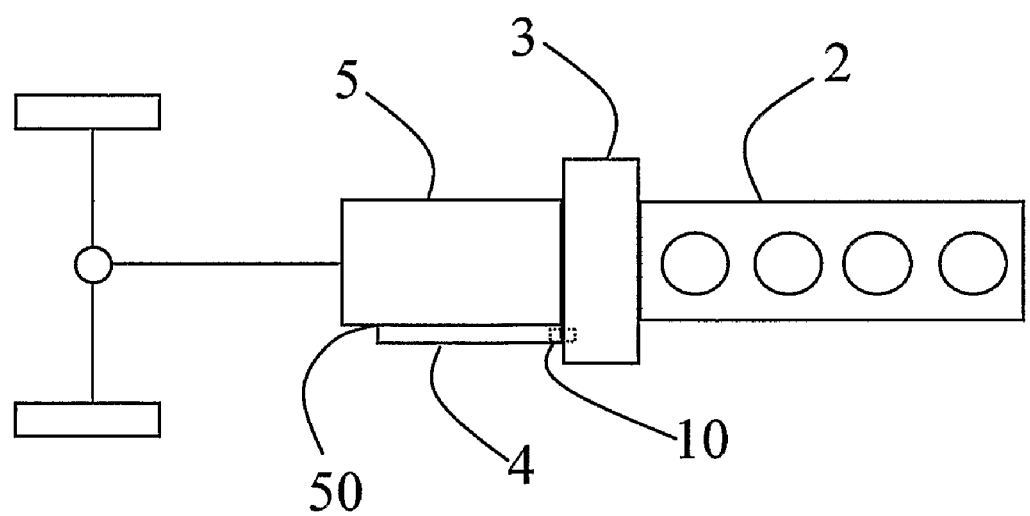

FIGS. 1a and 1b show a PHEV power train 1 comprising a first embodiment of the invention. The HEV power train comprises a combustion engine 2, an electric motor/generator 3 with a power electronics unit 4, a transmission 5, a propeller shaft 6 and drive wheels 7.

Arranged mainly coaxially inside of said electric motor/generator 3 is a clutch 8 (not visible in FIG. 1a or 1b), which is arranged to transmit torque between the engine 2 and the transmission 5 and which can be engaged or disengaged depending of vehicle condition. The transmission can be a step geared transmission with several gear ratios.

According to the invention the power electronics unit 4 is formed as a relatively thick space efficient plate arranged along one side of the transmission 5. The outer of the transmission housing can have a cubic form or a cylinder form or something in between. When the power electronics unit is said to be arranged along a side of said transmission housing, this side is defined as the projection of the outer contour of the transmission housing. Thus, said projection can be a cross sectional plane of the transmission housing along which said power electronics unit is arranged.

In FIGS. 1a and 1b a first attachment point is defined by said side of the transmission housing and a first side of the power electronics unit. Said sides are in contact with each other over substantially the whole area of said first side of the power electronics unit so that a total thermal conductivity corresponding to less than 10 degrees temperature difference on a Kelvin-scale between electronics of said power electronics unit and the outside of said first transmission side for 5 kW of heat originating from one side of said first attachment point 50.

Where thermal conductivity=$Q/\delta T=(k \cdot A)/L$, and where
Q=heat flow rate,
$\delta T$=temperature difference,
k=thermal conductivity,
A=area,
L=distance
The SI-unit for thermal conductivity is $W \cdot —K^{-1}$.

Thus, the attachment point 50 is designed in such a way as to have a relatively high thermal conductivity. This can be achieved for example by choosing materials for the walls of the transmission housing and the first side of the power electronics unit having high thermal conductivity. Examples of materials with high thermal conductivity are metals.

Above is mentioned that the power electronics unit can be formed as a plate. If the transmission housing has a substantially cylindrical form, said power electronics unit can then be wrapped around the outer surface of said cylinder formed transmission in order to increase the contact between the transmission housing wall and the wall of the power electronics unit.

In the embodiment showed in FIGS. 1a and 1b a second attachment point 10 is used for fixing the power electronics unit to the motor/generator 3. This second attachment point is formed as a plug in connection 10 arranged to fix the power electronics unit to the electric motor/generator 3. The plug in connection can also be arranged to have a thermal conductivity corresponding to less than 10 degrees temperature difference on a Kelvin-scale between electronics of said power electronics unit and the outside of said motor/generator 3 for 5 kW of heat originating from one side of said second attachment point.

Figure 2A:
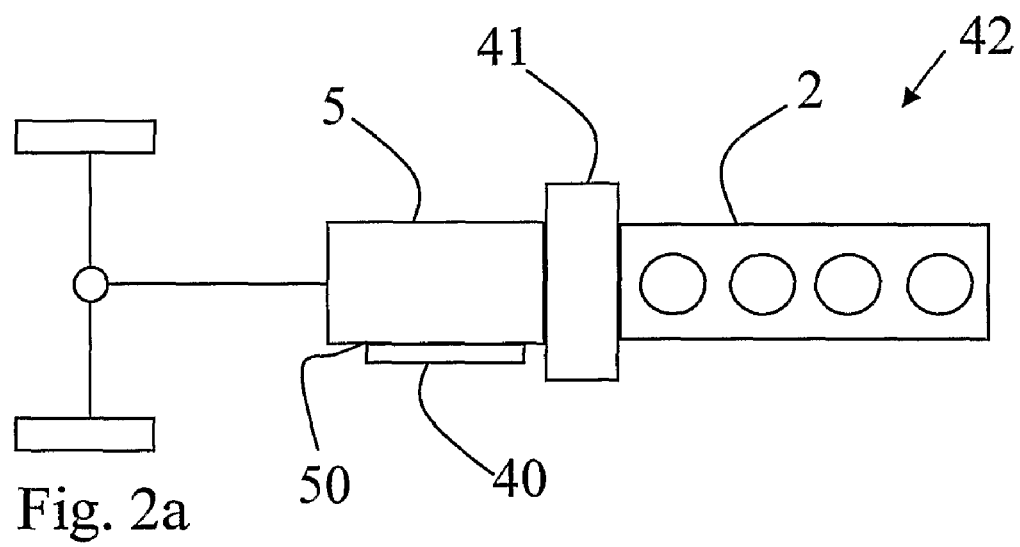
FIGS. 2a and 2b diagrammatically shows a PHEV power train in two-different views of an embodiment of the invention.
Figure 2B:
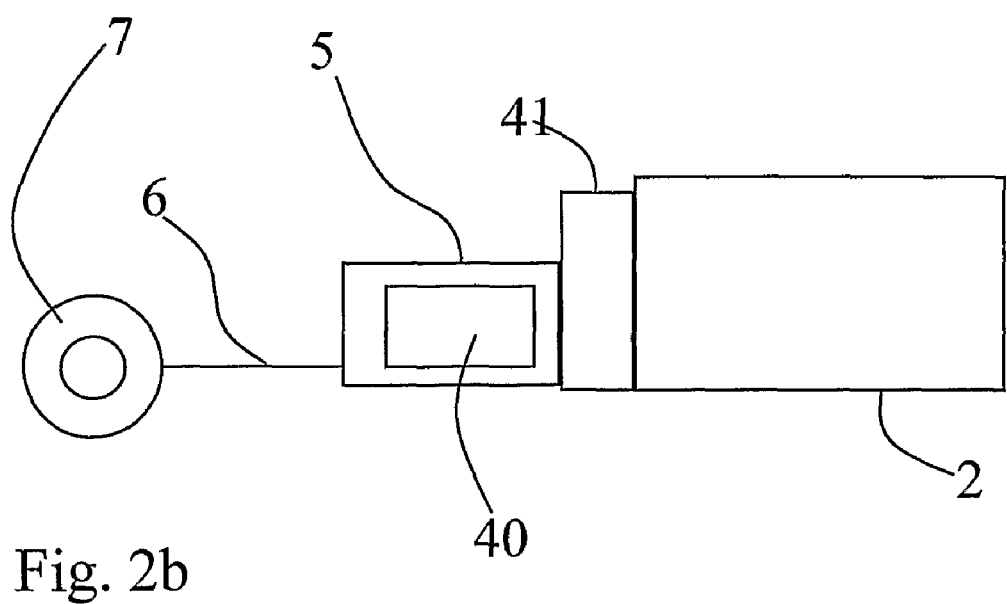

FIGS. 2a and 2b disclose a HEV power train 42 similar to the one in FIGS. 1a and 1b. According to the invention also a power electronics unit 40, as in the above described embodiments, is formed as a relatively thick space efficient plate arranged along one side of the transmission 5. The main difference is that the embodiment of FIGS. 2a and 2b does not have any plug in connection. Thus the motor/generator 41 is slightly modified compared to the one shown in for example FIGS. 1a and 1b. Instead of a power electronics unit being connected to the electric/motor via said plug in connection, the power electronics unit 40 of the embodiment in FIGS. 8a and 8b can be somewhat shorter and is attached to the transmission housing side only. In one embodiment the transmission of cooling medium and/or electric power to and from the power electronics unit 40 can be performed in a known manner through hoses and electric wires respectively (not shown). In another embodiment of the invention there is only electric power transmitted to and from the power electronics unit through electric wires.

In a further alternative embodiment of the invention said wall of the transmission housing and said wall of the first side of the power electronics unit in the embodiments of FIGS. 1a, 1b, 2a and 2b can be integrated and formed by one and the same wall. Thus, the power electronics unit, when mounted on the transmission side, can comprise only of a casing with one open side, which open side will be turned against said transmission wall when the casing is mounted on the transmission wall with said electronics of the power electronics unit within said casing. The electronics as such can be fixed to said casing and/or to said transmission wall. According to the invention the most important feature regarding thermal conductivity is that the electronics of the power electronic unit is in contact with said transmission wall in order to increase heat transmission from the electronics.

Further, the electronics of the power electronics unit has to be cooled in order to secure functionality. A cooling arrangement (not showed) in the power electronics unit can in one embodiment of the invention be connected to a second cooling arrangement (not showed) of said electric motor/generator via the plug in connection 10, thus integrating the power electronics unit and the electric motor/generator. The plug in connection can also comprise necessary electric connections between the power electronics unit 4 and the electric motor/generator 3 or only one of said electric connections and said cooling arrangement connection. Said cooling arrangements form together with other necessary, not shown components, a cooling system of the power electronics unit and the motor/generator.

In a further embodiment said integrated wall can comprise cooling channels arranged for cooling said electronics in the power electronics unit and the transmission. Said cooling channels in the wall can be connected to the cooling arrangement of the power electronics unit and/or to said second cooling arrangement of said motor/generator and/or to a cooling arrangement of the transmission. In a further embodiment the only arrangement for cooling the power electronics unit can be said cooling channels arranged in the integrated wall between the transmission and power electronics unit or cooling channels arranged only in the wall of the transmission side, when said walls of the transmission side and power electronics unit are not integrated. A cooling fluid flowing through said channels can be a lubricant of said transmission or in an alternative embodiment a for example water.

In another embodiment of the invention said integrated wall can be used where the transmission is only cooled directly by ambient air, that is there is no cooling channels arranged in the transmission nor the power electronics unit. Thus, there can be several different types of cooling arrangements used. The different mentioned cooling arrangements according to prior art can be used with all different embodiments of the invention disclosed in this description.

In a further embodiment of the invention said casing of said power electronics unit can have a noise damping function. This, can be achieved, for example, by said casing being made of a noise damping material, such as plastic, or being made of metal with a noise damping layer arranged on the inner surface of the casing turned towards the transmission wall. If the casing is of metal the connecting surface between the transmission wall and the casing preferably has to be of a noise damping material, such as rubber.

Figure 3:
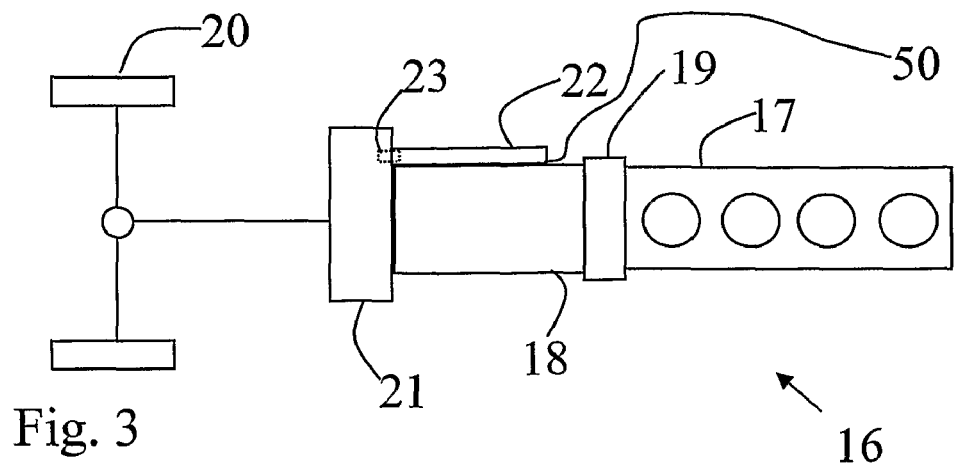
FIGS. 3 to 5 diagrammatically show a top view of further three different PHEV power trains and embodiments of the invention.

FIG. 3 discloses a PHEV power train 16, where a combustion engine 17 is connected to an input shaft (not shown) of a stage geared transmission 18 via a clutch 19. The transmission 18 is further connected to driven wheels 20 via an electric motor/generator 21 attached at an output shaft (not shown) of the transmission 18. A power electronics unit 22 is attached to one side of the transmission housing with one or several of the same features according to the invention as mentioned in the preceding embodiments. Said power electronics unit is further attached 50 to the electronic motor/generator via a plug in connection 23. In a further embodiment of the invention this plug in connection can be replaced by electric wires (as mentioned above in connection to FIGS. 2a and 2b). Further the transmission side and the power electronics unit can have separated walls connected to each other or these walls can be integrated (as mentioned above), thus forming one wall.

Figure 4:
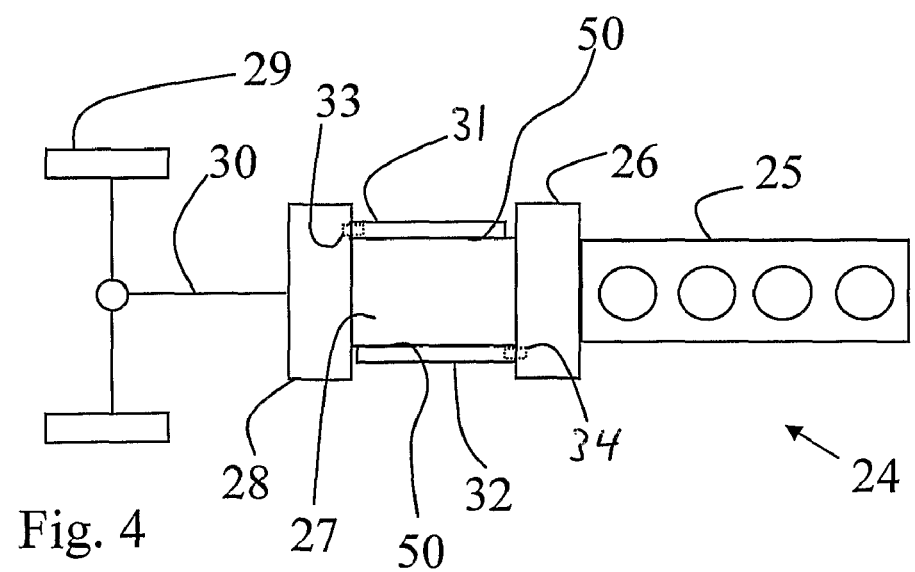

FIG. 4 discloses an embodiment of the invention based on a combination of the embodiments mentioned in relation to FIGS. 1a, 1b and 3. Thus, this power train 24 comprises besides a combustion engine 25, a clutch (not shown) coaxially arranged inside of a first
electric motor/generator 26, a step geared transmission 27, a second electric motor/generator 28 connected to an output shaft (not shown) of the transmission and driven wheels 29 connected to the second electric motor/generator 28 via for example a propeller shaft 30. The two electric motor/generators have each of them a power electronics unit 31 and 32 arranged in the corresponding way as in at least one of the earlier mentioned embodiments with plug in connections 33 and 34. Of coarse, embodiments where the plug in connections have been replaced with cables is also possible. In a further embodiment said power electronics units 31 and 32 can have noise reduction functionality, as mentioned in the embodiments above. The power electronics units 31 and 32 are attached on each side of the transmission 27 at attachment point 50.

Figure 5:
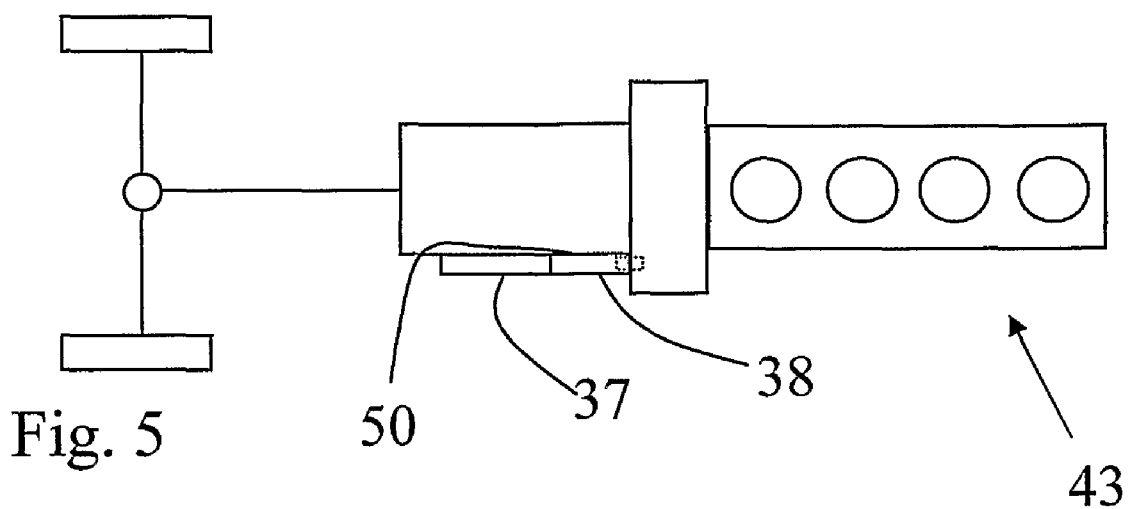

FIG. 5 discloses a similar HEV power train 43 as in FIGS. 1a and 1b. Here said power electronics unit plate comprises said power electronics unit 38 with noise damping material (as in above mentioned embodiments and attached to the transmission at attachment point 50) and in an extended part 37 only of a noise damping material. The extended part 37 is fixed to the power electronics unit 38 and the transmission side, and is arranged in order to better cover said first transmission side in order to increase noise reduction. This embodiment can also be applied to the other mentioned embodiments.

The above mentioned inventive features can also be applied to a heavy PSHEV (power split) with several mechanical fixed gear steps in the transmission.

The invention should not be deemed to be limited to the embodiments described above, but rather a number of further variants and modifications are conceivable within the scope of the following patent claims.

The invention claimed is:

1. Arrangement for a power electronics unit in a hybrid vehicle power train, the hybrid vehicle power train comprising a combustion engine arranged for propulsion, and an electric motor/generator arranged for propulsion, a transmission with a transmission housing, the transmission is arranged to adapt gear ratio between at least one of the propulsion units and driven vehicle wheels, the motor/generator is arranged to exchange electric power with a power electronics unit, a cooling arrangement for cooling at least the transmission with the transmission housing, the power electronics unit is shaped substantially as a plate, where a first biggest cross-sectional area of the plate is extended substantially along and substantially within a first transmission side of the transmission housing and covering at least a part of the first transmission side, the power electronics unit is fixed to the hybrid vehicle power train with at least one first attachment point, wherein all attachment points have a total thermal conductivity corresponding to less than 10 degrees temperature difference on a Kelvin-scale between electronics of the power electronics unit and the outside of the first transmission side for 5 kW of heat originating from one side of the attachment point.

2. Arrangement as in claim 1, wherein a first side of the power electronics unit, facing the transmission, and the first transmission side are in contact with each other, forming the first attachment point as a wall to wall attachment point.

3. Arrangement as in claim 1, wherein a first side of the power electronics unit and the first transmission side are integrated and form a common wall between the transmission and electronics of the power electronics unit.

4. Arrangement as in claim 3, wherein the common wall comprising cooling channels connected to the cooling arrangement for cooling the power electronics unit and the transmission.

5. Arrangement as in claim 1, wherein the first attachment point is made of a material with a relatively high thermal conductivity.

6. Arrangement as in claim 5, wherein the material is a metal.

7. Arrangement as in claim 1, wherein the electric motor/generator and the power electronics unit are connected and fixed to each other, and where the connection is a second attachment point formed by a plug in connection.

8. Arrangement as in claim 7, wherein the plug in connection is arranged to transmit at least one of or both of a cooling medium for the cooling arrangement and electric power between the motor/generator and the power electronics unit.

9. Arrangement as in claim 1, wherein the power electronics unit plate is arranged to cover the first transmission side in such a way as to damp noise originating from the transmission.

10. Arrangement as in claim 1, wherein the power electronics unit comprising a casing of noise damping material, and which casing covers the electronics when arranged on the first transmission side.

11. Arrangement as in claim 1, wherein the power electronics unit plate comprises the noise damping design and in an extended part only of a noise damping material, and where the extended part is arranged in order to better cover the first transmission side.

12. Arrangement as in claim 1, wherein a second electric motor/generator with a second power electronics unit are arranged in connection to the transmission, and where the second power electronics unit is arranged along a second transmission side of the transmission housing.

13. Arrangement as in claim 1, wherein the hybrid vehicle power train is a parallel hybrid electric vehicle power train.

* * * * *